(12) United States Patent
Meir

(10) Patent No.: US 7,509,594 B2
(45) Date of Patent: Mar. 24, 2009

(54) METHOD OF SELLING INTEGRATED CIRCUIT DIES FOR MULTI-CHIP PACKAGES

(75) Inventor: Avraham Meir, Rishon Lezion (IL)

(73) Assignee: SanDisk IL Ltd., Kfar Saba (IL)

( * ) Notice: Subject to any disclaimer, the term of this patent is extended or adjusted under 35 U.S.C. 154(b) by 362 days.

(21) Appl. No.: 11/174,495

(22) Filed: Jul. 6, 2005

(65) Prior Publication Data

US 2007/0011635 A1 Jan. 11, 2007

(51) Int. Cl.
*G06F 17/15* (2006.01)
*H03K 17/693* (2006.01)
*H01M 10/14* (2006.01)

(52) U.S. Cl. ............... 716/1; 716/15; 716/16; 29/830

(58) Field of Classification Search .............. 716/1, 716/8, 9, 12, 16; 700/121; 326/38; 324/765; 257/81, 82; 29/832
See application file for complete search history.

(56) References Cited

U.S. PATENT DOCUMENTS

| | | | |
|---|---|---|---|
| 6,295,634 B1 * | 9/2001 | Matsumoto | 716/12 |
| 6,385,756 B1 * | 5/2002 | Braun | 716/1 |
| 6,525,560 B1 * | 2/2003 | Trimberger et al. | 326/38 |
| 6,525,986 B2 * | 2/2003 | Prutchi et al. | 365/230.03 |
| 6,604,231 B2 * | 8/2003 | Kaneko | 716/16 |
| 6,686,768 B2 * | 2/2004 | Comer | 326/38 |
| 6,735,755 B2 * | 5/2004 | Shau | 716/16 |
| 6,795,746 B2 * | 9/2004 | Chuang et al. | 700/121 |
| 6,880,145 B1 * | 4/2005 | Wright et al. | 716/12 |
| 6,956,244 B2 * | 10/2005 | Dudoff et al. | 257/82 |
| 6,983,438 B1 * | 1/2006 | Newman et al. | 716/8 |
| 7,053,470 B1 * | 5/2006 | Sellers et al. | 257/678 |
| 7,068,072 B2 * | 6/2006 | New et al. | 326/47 |
| 7,174,627 B2 * | 2/2007 | Gann | 29/827 |
| 7,251,805 B2 * | 7/2007 | Koo | 716/16 |
| 7,279,921 B1 * | 10/2007 | Iacob | 324/765 |
| 7,370,303 B2 * | 5/2008 | Einspenner et al. | 716/8 |
| 2002/0073392 A1 * | 6/2002 | Morgan et al. | 716/9 |
| 2005/0027928 A1 * | 2/2005 | Avraham et al. | 711/103 |
| 2005/0278666 A1 * | 12/2005 | Diamond | 716/4 |
| 2006/0097284 A1 * | 5/2006 | Ronen | 257/203 |

* cited by examiner

*Primary Examiner*—Helen Rossoshek
(74) *Attorney, Agent, or Firm*—Mark M. Friedman

(57) ABSTRACT

An integrated circuit has a plurality of bonding pads, at least one of which is adapted to be directly electrically connected to a bonding pad of another integrated circuit rather than to an external pin of a package that houses a semiconductor die on which the integrated circuit is fabricated. The integrated circuit is designed and offered for sale. Preferred scenarios include offering the integrated circuit for sale even before receiving an order for the semiconductor die or alternatively, only in response to receiving a first such order. Preferably the die is offered for sale as a standard item. The dies are either fabricated on demand or kept in inventory.

21 Claims, 3 Drawing Sheets

US 7,509,594 B2

METHOD OF SELLING INTEGRATED CIRCUIT DIES FOR MULTI-CHIP PACKAGES

FIELD AND BACKGROUND OF THE INVENTION

The present invention relates to integrated circuits fabricated on semiconductor dies and, more particularly, to a method of selling such circuits that are intended for use in Multi-Chip Packages (MCPs).

FIG. 1 illustrates one prior art method of packaging integrated circuits fabricated on semiconductor dies. Specifically, FIG. 1 is a schematic plan view of the interior of a Single-Chip Package (SCP) 10. An integrated circuit 12 including a plurality of bonding pads 16 is fabricated on a semiconductor die 14. Semiconductor die 14 is mounted on a substrate 18 on which are formed electrically conductive traces 20 connected to pins 22. Each bonding pad 16 is electrically connected to a respective trace 20 by a wire bond 24. Pins 22 provide electrical connection of integrated circuit 12 to other components of a larger electronic device of which SCP 10 is one component.

MCPs were developed in order to allow electronic devices such as cellular telephone handsets to be made more compact than is possible using SCPs. FIG. 2 is a schematic plan view of the interior of an illustrative prior art MCP 30. Two integrated circuits 12A and 12B, each including respective pluralities of bonding pads 16, are fabricated on respective semiconductor dies 14A and 14B. Semiconductor dies 14A and 14B are mounted on a common substrate 18' on which are formed electrically conductive traces 20' connected to pins 22'. Most of the bonding pads 16 of integrated circuits 12A and 12B are electrically connected to respective traces 20' by wire bonds 24. Some of the bonding pads 16 of integrated circuit 12A are electrically connected directly to bonding pads 16 of integrated circuit 12B by wire bonds 26. Alternatively, the bonding pads 16 of integrated circuits 12A and 12B that are connected to each other could be connected via wire bonds to traces, similar to traces 22', on substrate 18'.

Prior art integrated circuits 12, 12A and 12B are designed on the assumption that bonding pads 16 are to be electrically connected to pins 22 by electrical circuitry such as wire bonds 24 and traces 20, without any intervening electronic components. These assumptions mandate the inclusion in integrated circuits 12, 12A and 12B of corresponding features such as electrostatic discharge protection and adequate input-output driver strength.

SUMMARY OF THE INVENTION

The present invention is motivated by the observation that the bonding pads 16 of integrated circuits 12A and 12B that are directly electrically connected to each other by wire bonds 26 need not be adapted to be connected to external pins 22. For example, these bonding pads 16 do not need electrostatic discharge protection, and the associated input/output drivers need not be as strong as the input/output drivers for bonding pads 16 that are to be directly electrically connected to external pins 22. This provides business opportunities to designers and manufacturers of integrated circuits: related to designing and offering for sale versions of their integrated circuits that are intended for use in MCPs.

Therefore, according to the present invention there is provided a method of doing business, including: (a) designing a first integrated circuit that includes a plurality of bonding pads, at least one of the bonding pads being adapted to be directly electrically connected to a bonding pad of another integrated circuit rather than to an external pin of a package that houses a semiconductor die whereon the first integrated circuit is fabricated; and (b) offering at least one such semiconductor die for sale.

A "direct electrical connection" is understood herein to mean an electrical connection only via electrical conductors, without the intermediation of an electronic circuit.

An "external pin" of an integrated circuit package is understood herein to mean any mechanism for electrically connecting an integrated circuit inside the package to another electrical or electronic device outside the package. Common examples of such "external pins" include both conventional pins and solder balls.

That two integrated circuits have "substantially identical functionality" or "equivalent functionality" means that the two integrated circuits, upon receiving equivalent input signals, perform essentially the same operation(s) on the signals. For example, two such memory circuits, upon receiving equivalent signals whose meaning is that a set of data bits are to be stored at certain memory addresses, both store those data bits at those addresses. That the input (or output) signals are equivalent, rather than identical, is intended to include within the scope of this definition the possibility that the signals are transmitted at different clock rates but are otherwise identical.

That a bonding pad is "adapted to be directly electrically connected" to another electrical or electronic entity means that the integrated circuit that includes that bonding pad is designed in a manner appropriate to exchanging electrical signals with that other entity via that bonding pad. For example, the adaptation of a bonding pad for direct electrical connection to an external pin includes providing electrostatic discharge protection for the bonding pad. A bonding pad that is adapted to be directly electrically connected to an external pin is implicitly also adapted to be directly electrically connected to a bonding pad of another integrated circuit, with no loss of integrated circuit functionality; but a bonding pad that is adapted to be directly electrically connected to another integrated circuit is not adapted to be directly electrically connected to an external pin, without sacrificing integrated circuit functionality. For example, an integrated circuit that is intended for use in MCPs may still be operable with its bonding pads, that are adapted to be directly electrically connected to another integrated circuit, directly connected instead to external pins, but only at a significantly lower clock rate.

The basic method of the present invention has two steps. In the first step, an integrated circuit, intended for use in MCPs, is designed. The integrated circuit includes a plurality of bonding pads, at least one of which is adapted to be directly electrically connected to a bonding pad of another integrated circuit rather than to an external pin of a package that houses a semiconductor die on which the integrated circuit is fabricated. In the second step, one or more semiconductor dies, on which the integrated circuit is fabricated, is offered for sale.

The present invention contemplates three preferred scenarios for offering the semiconductor die(s) for sale.

In the first scenario, the semiconductor die(s) is/are offered for sale before ever receiving an order for the semiconductor die(s). In other words, the MCP integrated circuit is designed and offered for sale in advance of an indication, in the form of an order for dies bearing such integrated circuits, that a demand for such dies exists.

In the second scenario, the semiconductor die(s) is/are offered for sale only subsequent to receiving an order for the semiconductor die(s). In other words, the manufacturer of the dies takes the first order as an indication of a demand for such dies, and responds to that indication by offering the dies for sale. Under the second scenario, the integrated circuit could be designed either by the party that places the order or by the manufacturer who receives the order.

In the third scenario, the semiconductor die(s) is/are offered for sale as a standard item. A "standard item" is understood herein to mean an item that can be ordered by a customer merely by identifying the item, for example by providing a catalog number, without having to define the specifications of the item.

Preferably, the method also includes the step of fabricating the semiconductor die(s), for example upon receiving an order for the semiconductor die(s).

Preferably, a plurality of the semiconductor dies is fabricated. The plurality of semiconductor dies may be fabricated upon receiving an order for the semiconductor dies, rather than being kept in inventory. Alternatively, an inventory of the semiconductor dies is maintained, optionally even before ever receiving an order for the semiconductor dies. Preferably, the inventory is of the semiconductor dies fabricated on at least one semiconductor wafer, with the intention of selling entire wafers, and/or of separate semiconductor dies that are to be sold individually.

Preferably, the MCP integrated circuit is designed with reference to a reference integrated circuit that includes a plurality of bonding pads adapted to be directly electrically connected to respective external pins of a package that houses a semiconductor die on which the reference integrated circuit is fabricated. The two integrated circuits are substantially identical in functionality. Each of the bonding pads of the MCP circuit that is adapted to be directly electrically connected to a bonding pad of another integrated circuit corresponds to one or more of the bonding pads of the reference integrated circuit. Usually, each bonding pad of the MCP circuit that is adapted to be directly electrically connected to a bonding pad of another integrated circuit corresponds to only one of the bonding pads of the reference integrated circuit; but an example is presented below in which a bonding pad of the MCP circuit, that is adapted to be directly electrically connected to a bonding pad of another integrated circuit, corresponds to two bonding pads of the reference integrated circuit.

More preferably, pluralities of both the MCP integrated circuit and the reference integrated circuit are fabricated on corresponding pluralities of respective semiconductor dies. The pluralities of semiconductor dies may be fabricated upon receiving an order for them, rather than being kept in inventory. Alternatively, inventories of the two kinds of semiconductor dies are maintained simultaneously, optionally even before ever receiving an order for the semiconductor dies on which the MCP integrated circuits are fabricated.

Examples of types of integrated circuits that are intended for use in MCPs, according to the present invention, include processors and memories.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of business methods of selling integrated circuits that are specifically adapted to be packaged in MCPs.

The principles and operation of business methods according to the present invention may be better understood with reference to the drawings and the accompanying description.

Figure 1:
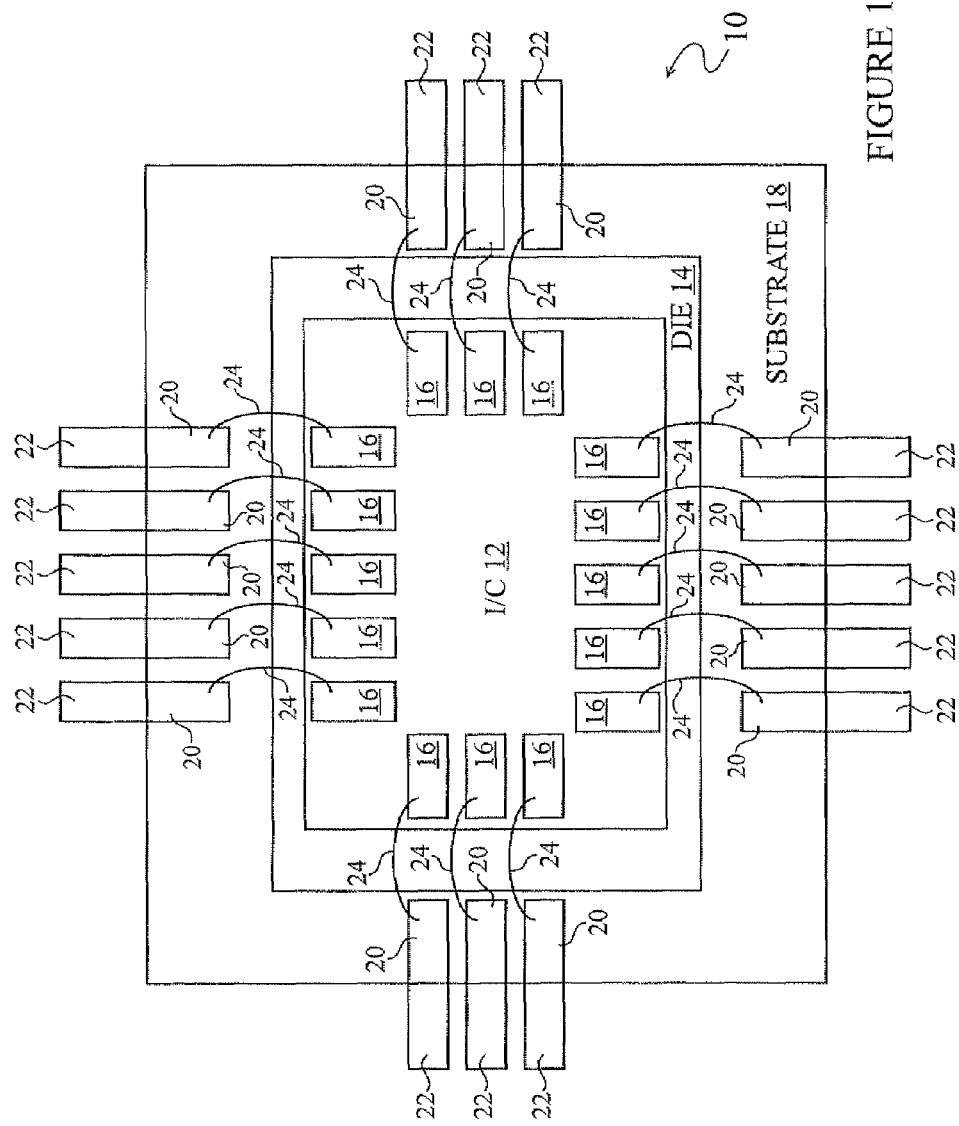
FIG. 1 is a schematic plan view of the interior of a (prior art) SCP.
Figure 2:
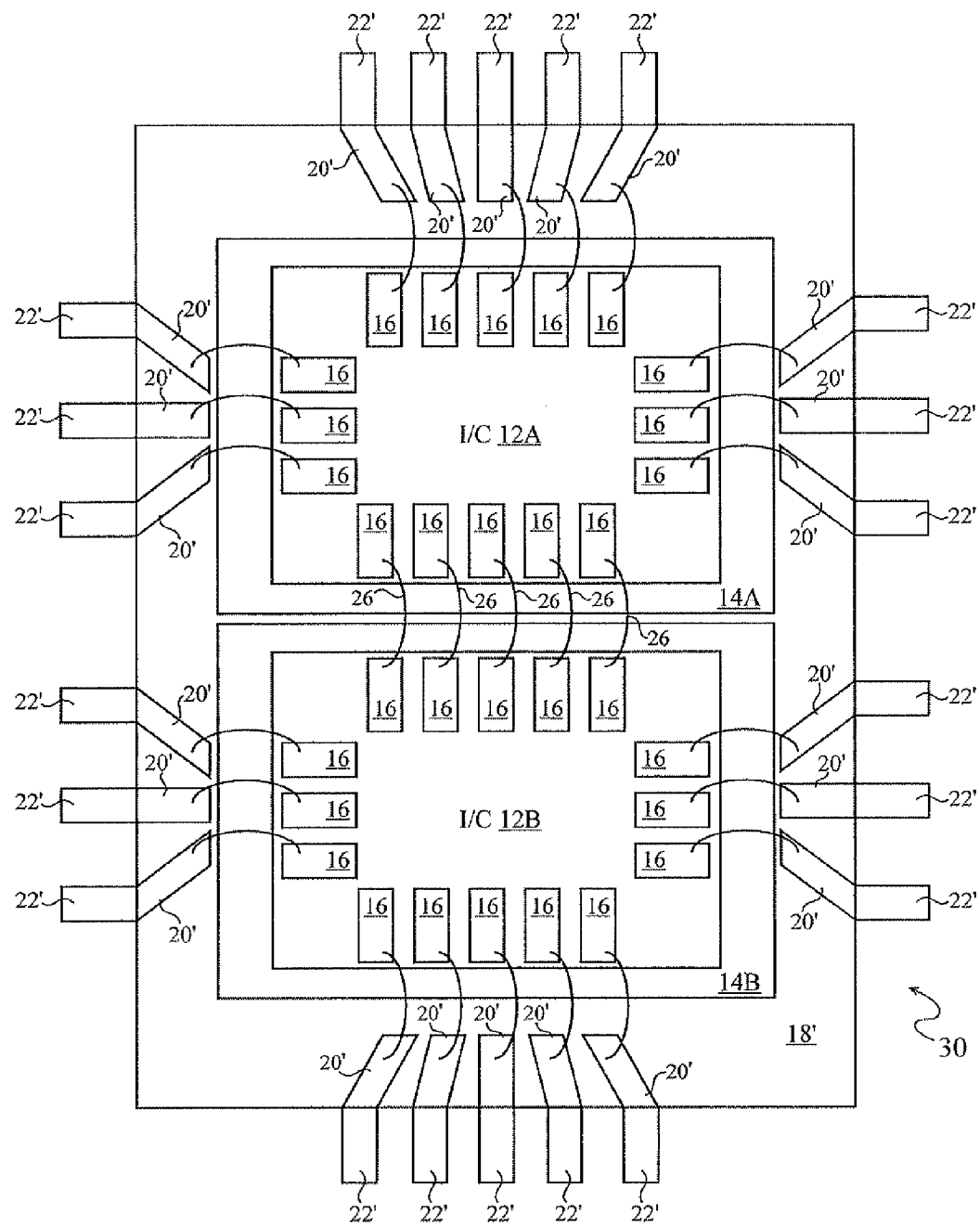
FIG. 2 is a schematic plan view of the interior of a prior art MCP.
Figure 3:
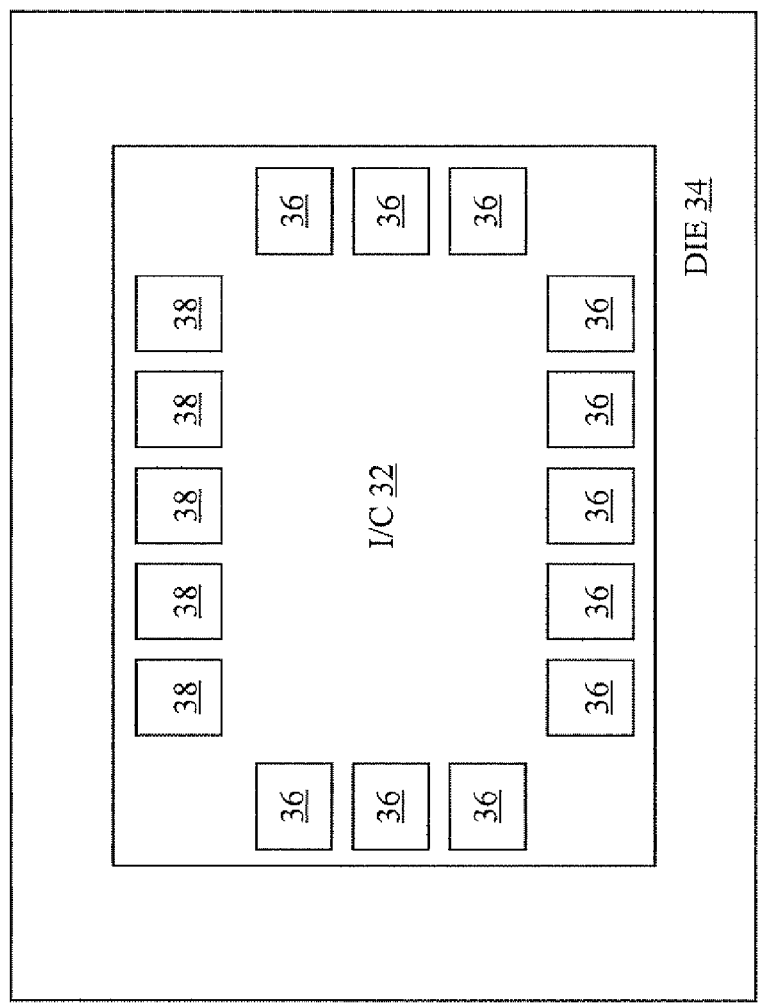
FIG. 3 is a schematic plan view of an integrated circuit die of the present invention.

Referring again to the drawings, FIG. 3 is a schematic plan view of an integrated circuit 32 of the present invention fabricated on a semiconductor die 34. Integrated circuit 32 includes two kinds of bonding pads: bonding pads 36 that are adapted to be directly electrically connected to pins such as pins 22' and bonding pads 38 that are adapted to be directly electrically connected to bonding pads of other integrated circuits. It will be clear to those skilled in the art how to modify the design of a prior art integrated circuit such as integrated circuit 12 to transform that design into an functionally equivalent integrated circuit 32 of the present invention. For example, the input-output driver of bonding pads 38 of integrated circuit 32 can be made simpler than the input-output driver of the corresponding bonding pads 16 of integrated circuit 12 while having integrated circuit 32 operate at the same clock rate as integrated circuit 12. Alternatively, because the electrical connection of bonding pads 38 to the bonding pads of an integrated circuit to which integrated circuit 32 is directly connected is much shorter than the electrical connection of the corresponding bonding pads 16, via pins 22, of integrated circuit 12 to some other component of the system of which SCP 10 is a part, integrated circuit 32 can be designed to operate at a faster frequency, at least with respect to signals exchanged via bonding pads 38, than a corresponding reference integrated circuit 12.

One specific example of an integrated circuit 32 of the present invention is a DRAM circuit. The corresponding integrated circuit 12 is a DRAM circuit with a DDR interface for receiving clock signals. In such an interface, the clock signal is a differential signal: the difference between two voltages received at two different bonding pads 16. A differential signal is used to drive the timing of integrated circuit 12 in order to overcome the noise associated with sending this signal via the relatively long electrical connections via pins 22 and traces 20. The corresponding integrated circuit 32 of the present invention needs only one bonding pad 38 to receive the clock signal from an adjacent integrated circuit with which integrated circuit is packaged in a common MCP, because of the short electrical connection between bonding pad 38 and the other integrated circuit. Despite the clock signal not being a differential signal, integrated circuit 32 operates at the same speed as, or even faster than, integrated circuit 12.

In some integrated circuits of the present invention, all the bonding pads are adapted to be directly electrically connected to bonding pads of another integrated circuit, and not to external pins of the package in which the integrated circuits are packaged. One such example is a flash memory integrated circuit, intended to be packaged together, for use in a flash memory device, with a processor integrated circuit that serves as a controller for the flash memory integrated circuit. Because the flash memory integrated circuit interacts with the outside world only via the controller, including receiving operating power only via the controller, all the bonding pads of the flash memory integrated circuit are adapted to be directly connected to bonding pads of the controller. The bonding pads of the controller that are directly electrically connected to the bonding pads of the flash memory integrated circuit are similarly adapted. As in integrated circuit 32, other bonding pads of the controller are adapted to be directly electrically connected to external pins of the common package.

A designer and manufacturer of integrated circuit 32 offers integrated circuit 32 for sale to manufacturers of MCPs. Integrated circuit 32 is offered for sale either as illustrated in FIG. 3, as an individual bare die 34, or as many such dies 34 fabricated together on the same semiconductor wafer. In either case, integrated circuit 32 is offered for sale as such, not electrically connected to any other integrated circuit.

Preferably, a designer and manufacturer of integrated circuits designs two versions of an integrated circuit: a version 12 intended for use in SCPs and a functionally equivalent version 32 intended for use in MCPs. The integrated circuit so designed may be any kind of integrated circuit, including but not limited to a processor or a memory. The designer and manufacturer then fabricates multiple instances of versions 12 and 32 on respective semiconductor dies 14 and 34, advertises them for sale, and keeps them in inventory in anticipation of receiving orders for them. Alternatively, semiconductor dies 14 and 34 are fabricated on demand, upon receipt of the orders, and no inventory is maintained. Instances of versions 32, in particular, are offered for sale to manufacturers of MCPs, even in advance of having received orders for version 32. Version 32 is offered for sale in anticipation of manufacturers of MCPs, having seen version 12, wanting to incorporate similar integrated circuits in their MCPs.

In an alternative scenario, version 32 is designed, together with or independently of version 12, only upon receipt of a first order for such an integrated circuit, that order being taken as an indication that a demand exists for such an integrated circuit. Indeed, under this scenario, version 32 need not be designed by the manufacturer of semiconductor die 34: version 32 could be designed by the party that orders the first instance or instances of semiconductor die 34.

Preferably, version 32 is offered for sale as a standard item.

While the invention has been described with respect to a limited number of embodiments, it will be appreciated that many variations, modifications and other applications of the invention may be made.

What is claimed is:

1. A method of doing business, comprising:
   (a) designing an integrated circuit to be fabricated as a sole integrated circuit on a semiconductor die, said sole integrated circuit including a plurality of bonding pads, all of said bonding pads being adapted to be directly electrically connected, subsequent to a sale and delivery of said semiconductor die, to bonding pads of at least one other integrated circuit rather than to external pins of a package that houses a semiconductor die whereon said sole integrated circuit is fabricated; and
   (b) offering at least one said semiconductor die for sale.

2. The method of claim 1, wherein said at least one semiconductor die is offered for sale before receiving an order for said at least one semiconductor die.

3. The method of claim 1, wherein said at least one semiconductor die is offered for sale only subsequent to receiving an order for said at least one semiconductor die.

4. The method of claim 3, wherein said designing of said sole integrated circuit is effected by a party that places said order.

5. The method of claim 3, wherein said designing of said sole integrated circuit is effected in response to said receiving of said order.

6. The method of claim 1, wherein said at least one semiconductor die is offered for sale as a standard item.

7. The method of claim 1, further comprising the step of:
   (c) fabricating said at least one semiconductor die.

8. The method of claim 7, wherein said at least one semiconductor die is fabricated upon receiving an order for said semiconductor die.

9. The method of claim 1, further comprising the step of:
   (c) fabricating a plurality of said semiconductor dies.

10. The method of step 9, wherein said plurality of said semiconductor dies is fabricated upon receiving an order for said semiconductor dies.

11. The method of claim 9, further comprising the step of
    (d) maintaining an inventory of said semiconductor dies.

12. The method of claim 11, wherein said plurality of said semiconductor dies is fabricated and said inventory is maintained before receiving an order for said semiconductor dies.

13. The method of claim 11, wherein said semiconductor dies are fabricated on at least one wafer, and wherein said inventory is of said at least one wafer.

14. The method of claim 11, wherein said inventory is of said semiconductor dies to be sold individually.

15. The method of claim 1, wherein said sole integrated circuit is a processor.

16. The method of claim 1, wherein said sole integrated circuit is a memory.

17. A method of doing business, comprising:
    (a) designing a first integrated circuit to be fabricated as a sole integrated circuit on a semiconductor die, said first integrated circuit including a plurality of bonding pads, at least one of said bonding pads being adapted to be directly electrically connected, subsequent to a sale and delivery of said semiconductor die, to a bonding pad of another integrated circuit rather than to an external pin of a package that houses a semiconductor die whereon said first integrated circuit is fabricated; and
    (b) offering at least one said semiconductor die for sale;
    wherein said first integrated circuit is designed with reference to a second integrated circuit that includes a plurality of bonding pads adapted to be directly electrically connected to respective external pins of a package that houses a semiconductor die whereon said second integrated circuit is fabricated, said first and second integrated circuits being substantially identical in functionality, each said bonding pad of said first integrated circuit that is adapted to be directly electrically connected to a bonding pad of another integrated circuit corresponding to a respective at least one of said bonding pads of said second integrated circuit that are adapted to be directly electrically connected to respective said external pins.

18. The method of claim 17, further comprising the steps of:
    (c) fabricating a plurality of said first integrated circuits on a plurality of respective semiconductor dies; and
    (d) fabricating a plurality of said second integrated circuits on a plurality of respective semiconductor dies.

19. The method of claim 18, wherein said pluralities of said semiconductor dies are fabricated upon receiving an order for said semiconductor dies.

20. The method of claim 18, further comprising the step of:
    (e) maintaining, simultaneously, an inventory of said semiconductor dies whereon said first integrated circuits are fabricated and an inventory of said semiconductor dies whereon said second integrated circuits are fabricated.

21. The method of claim 20, wherein said semiconductor dies are fabricated and wherein said inventories are maintained before receiving an order for said semiconductor dies whereon said first integrated circuits are fabricated.

* * * * *